J. KEAGY.
Vegetable Graters.
No. 133,585. Patented Dec. 3, 1872.
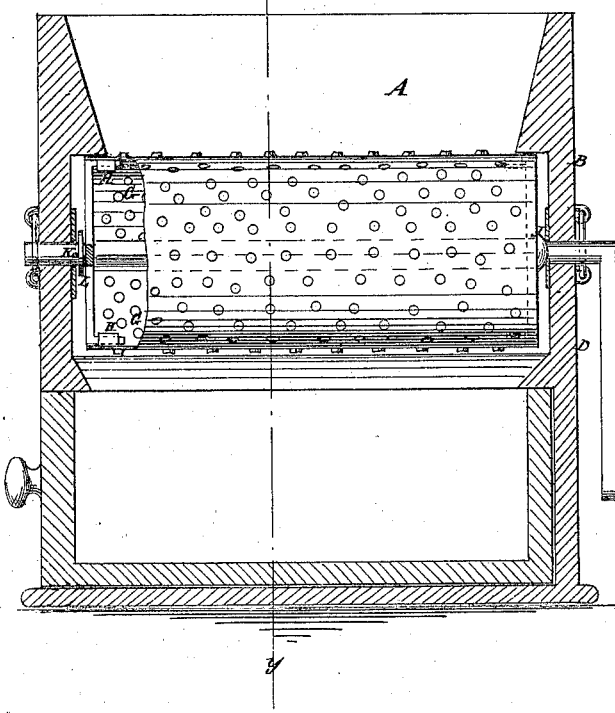
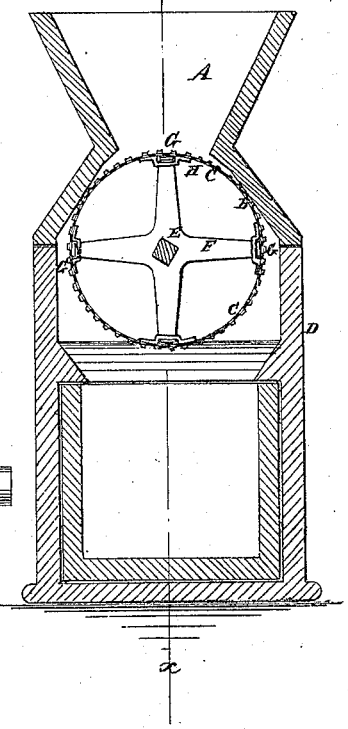

UNITED STATES PATENT OFFICE.

JOHN KEAGY, OF NEWARK, OHIO.

IMPROVEMENT IN VEGETABLE-GRATERS.

Specification forming part of Letters Patent No. 133,585, dated December 3, 1872.

*To all whom it may concern:*

Be it known that I, JOHN KEAGY, of Newark, in the county of Licking and State of Ohio, have invented a new and Improved Vegetable-Grater, of which the following is a specification:

My invention consists of a simple and efficient connection of the hollow sheet-metal punched grating-cylinder to the shaft detachably, for taking it off readily to clean it, by flanged ends of the spider-arms fitting against the inside of the cylinder, and clips of sheet metal soldered on the cylinder and extending around the sides of the flanges which are inserted between the clips and the cylinder by moving the cylinder endwise along the flanges, or the spiders along the cylinder, and they are kept in position by a fixed collar on the shaft for one spider and a washer and pin for the other, all as hereinafter described.

Figure 1 is a longitudinal sectional elevation of my improved grater taken on the line $x\,x$ of Fig. 2; and Fig. 2 is a transverse sectional elevation taken on the line $y\,y$.

Similar letters of reference indicate corresponding parts.

A is a long hopper joined onto the top of a curb, B, in about the plane of the top of the cylinder C, and the curb rests on the top of the case D about in the horizontal plane of the shaft E. F represents the spiders for supporting the cylinder at the ends. They have flanges G at the ends of the arms projecting into the cylinder and fitting the inside snugly, to be confined by the metal clips H soldered to the inside of the cylinder so that the flanges enter between them and the cylinder when the spiders and the cylinders are adjusted on the shaft, and the spiders are entered at the ends of the cylinders, as represented in the drawing. One spider rests against a collar, J, made fast upon the shaft near the crank, and the other is secured in connection with the cylinder and secures the cylinder and the other spider by a pin, K, and a washer, L.

It will be seen that the cylinder can be readily removed for cleaning, or for the application of a new one, by removing the pin and washer after the shaft has been lifted out of its bearings.

The drawer for reception of the gratings is arranged in the case below the cylinder to slide in and out endwise, and the curb and hopper are detachably connected to the case, substantially as in other grating-machines.

Having thus described my invention, I claim as new and desire to secure by Letters Patent—

The combination of the cylinder C, spiders F, flanges G, clips H, shaft E, fast collar J, washer L, and key K, all substantially as specified.

JOHN KEAGY.

Witnesses:
  JAMES WHITE,
  J. E. RANKIN.